US011969000B2

(12) United States Patent
Bak et al.

(10) Patent No.: US 11,969,000 B2
(45) Date of Patent: Apr. 30, 2024

(54) SWEETENER HAVING INCREASED ACID RESISTANCE OF OLIGOSACCHARIDES, FOOD CONTAINING SAME, AND METHOD FOR INCREASING ACID RESISTANCE OF OLIGOSACCHARIDES

(71) Applicant: CJ CHEILJEDANG CORPORATION, Seoul (KR)

(72) Inventors: Youn-Kyung Bak, Suwon (KR); Jung Gyu Park, Incheon (KR); Sung Bae Byun, Sejong (KR); Jong Min Choi, Suwon (KR); Seung Won Park, Yongin (KR); Dong Chul Jung, Seoul (KR)

(73) Assignee: CJ CHEILJEDANG CORPORATION, Seoul (KR)

( * ) Notice: Subject to any disclaimer, the term of this patent is extended or adjusted under 35 U.S.C. 154(b) by 303 days.

(21) Appl. No.: 16/078,607

(22) PCT Filed: Mar. 9, 2017

(86) PCT No.: PCT/KR2017/002601
§ 371 (c)(1),
(2) Date: Aug. 21, 2018

(87) PCT Pub. No.: WO2017/155345
PCT Pub. Date: Sep. 14, 2017

(65) Prior Publication Data
US 2019/0059428 A1     Feb. 28, 2019

(30) Foreign Application Priority Data

Mar. 9, 2016   (KR) .................. 10-2016-0028514

(51) Int. Cl.
| | |
|---|---|
| *A23L 27/30* | (2016.01) |
| *A21D 13/00* | (2017.01) |
| *A21D 13/80* | (2017.01) |
| *A23C 9/13* | (2006.01) |
| *A23L 2/60* | (2006.01) |
| *A23L 23/00* | (2016.01) |
| *A23L 29/30* | (2016.01) |

(52) U.S. Cl.
CPC ............... *A23L 27/33* (2016.08); *A21D 13/00* (2013.01); *A21D 13/80* (2017.01); *A23C 9/13* (2013.01); *A23L 2/60* (2013.01); *A23L 23/00* (2016.08); *A23L 27/30* (2016.08); *A23L 29/30* (2016.08); *A23V 2002/00* (2013.01)

(58) Field of Classification Search
CPC .......... A23L 27/30; A23L 27/33; A23L 29/00; A23L 29/30; A23V 2002/00
See application file for complete search history.

(56) References Cited

U.S. PATENT DOCUMENTS

| | | | |
|---|---|---|---|
| 9,215,887 B2 | 12/2015 | Yoshida et al. | |
| 2004/0047921 A1 | 3/2004 | Simmons et al. | |
| 2007/0116828 A1* | 5/2007 | Prakash | A23L 33/175 |
| | | | 426/548 |
| 2011/0045137 A1 | 2/2011 | Yoshida et al. | |
| 2014/0342044 A1 | 11/2014 | Bell et al. | |
| 2014/0342074 A1 | 11/2014 | Kim et al. | |
| 2014/0370171 A1* | 12/2014 | Takaoka | A23L 5/00 |
| | | | 426/302 |
| 2016/0029675 A1 | 2/2016 | Hattori et al. | |
| 2016/0324201 A1 | 11/2016 | Kim et al. | |
| 2018/0289042 A1 | 10/2018 | Bell et al. | |

FOREIGN PATENT DOCUMENTS

| | | | |
|---|---|---|---|
| CN | 102046027 | A | 5/2011 |
| CN | 101260419 | B † | 7/2013 |
| CN | 103906437 | A | 7/2014 |
| CN | 103997913 | A | 8/2014 |
| CN | 105101815 | A | 11/2015 |
| CN | 105163603 | A | 12/2015 |
| CN | 105338827 | A | 2/2016 |
| EP | 1377280 | B1 | 7/2007 |
| EP | 2286674 | A1 | 2/2011 |
| JP | 2013138660 | A | 7/2013 |
| JP | 2014140347 | A | 8/2014 |
| JP | 2014529994 | A | 11/2014 |
| KR | 100453576 | B1 | 10/2004 |
| KR | 100663065 | B1 * | 1/2007 |
| KR | 1020110016906 | A | 2/2011 |
| KR | 1020130029754 | A | 3/2013 |
| KR | 1020130052905 | A | 5/2013 |
| WO | WO2004000045 | A2 | 12/2003 |
| WO | WO2009133835 | A1 | 11/2009 |
| WO | WO2013039365 | A2 | 3/2013 |

(Continued)

OTHER PUBLICATIONS

Oshima et al. Decrease in the d-Psicose Content of Processed Foods Fortified with a Rare Sugar (Year: 2014).*
Kim KR 20130052905, translation (Year: 2013).*
Third Party Observation filed to EP Application No. 17763605.7, dated Sep. 13, 2018.
Tawainese Office Action for Patent Application No. 106107794, dated Jul. 17, 2018.
"Psicose", Wikipedia, Nov. 11, 2016, https://en.wikipedia.org/wiki/Psicose.
Bione, May 7, 2014, http://www.newmagazine.ne.jp/b-k-news-topics201408.html.
In et al., "Influencing Factors on the Hydrolysis of Fructooligosaccharides in Fructooligosaccharides Liquid Mixture", J. Korean Soc. Appl. Biol. Chem., 2006, pp. 86-89, vol. 49, Issue 1.

(Continued)

*Primary Examiner* — Erik Kashnikow
*Assistant Examiner* — Lela S. Davis

(57) ABSTRACT

The present application relates to a sweetener including an oligosaccharide having increased acid resistance, a food composition including the same, and a method of increasing acid resistance of an oligosaccharide of an oligosaccharide-containing sweetener including applying allulose to the oligosaccharide.

2 Claims, No Drawings

(56) References Cited

FOREIGN PATENT DOCUMENTS

| WO | WO2014168015 A1 | 10/2014 |
|---|---|---|
| WO | 2015075473 A1 | 5/2015 |

OTHER PUBLICATIONS

International Search Report for PCT/KR2017/002601 dated Jun. 20, 2017.

Jeong-Ryul Kim et al., "Physical and Physiological Properties of Isomaltooligosaccharides and Fructooligosaccharides", Korean Journal of Food Science and Technoloy, 1995, pp. 170-175, vol. 27, No. 2.

Ohta's Isan Rare Sugar Gold 400g, <URL: https://www.amazon.co.jp/株式会社-太田胃散%EF%BC%88%太田胃散-健康食品館 EF%BC%89-太田胃散-希少糖 Gold/dp/B017H2YXMO/ref=pd_sim_325_6/358-3887131-5054649?_encoding=UTF8&pd_rd_i=B017H2YXMO&pd_rd_r=58871b68-93af-11e9-aecc-e7a27fa0978f&pd_rd_w=jgLn4&pd_rd_wg=AeBY5&pf_rd_p=b88353e4-7ed3-4da1-bc65-341dfa3a88ce&pf_rd_r=2J04QEJYTMGX1B8Q5SHE_encoding=UTF8&pd_rd_i=B017H2YXMO&pd_rd_r=58874.

Rare Sugar Syrup + Oligosaccharide containing rare sugar (D-psicose), <URL: https://www.amazon.co.jp/株式会社 エーエフシ -F1046X03-【AFB公式ショップ】Dプシコース,シロップ-オリゴ糖-3本セット

Office Action dated Jan. 22, 2021 for related Canadian Patent Application No. 3,012,435.

First Office Action Notification dated Dec. 22, 2020 for related Chinese Patent Application No. 201780008424.4.

Bione, "Features of the rare sugar oligo", http://www.bione.co.jp/bione_reasuger.html, Feb. 6, 2016.

\* cited by examiner
† cited by third party

US 11,969,000 B2

SWEETENER HAVING INCREASED ACID RESISTANCE OF OLIGOSACCHARIDES, FOOD CONTAINING SAME, AND METHOD FOR INCREASING ACID RESISTANCE OF OLIGOSACCHARIDES

CROSS-REFERENCE TO RELATED APPLICATION

The present specification is a U.S. National Stage of International Patent Application No. PCT/KR2017/002601 filed Mar. 9, 2017, which claims priority to and the benefit of Korean Patent Application No. 10-2016-0028514 filed in the Korean Intellectual Property Office on Mar. 9, 2016, the entire contents of which are incorporated herein by reference.

TECHNICAL FIELD

The present application relates to a sweetener including an oligosaccharide having increased acid resistance, a food including the same, and a method of increasing acid resistance of an oligosaccharide.

BACKGROUND ART

Sugar (sucrose) is a sweetener that has been used since ancient times, and provides sweetness to which people are instinctively attracted in the easiest and cheapest way. However, as the use of sugar increases and the consumer economy grows, so does the claim that sugar is harmful to the body. In particular, as excessive intake of sugar has been shown to cause metabolic syndromes such as obesity, consumer demand for low-calorie substitutes having similar taste to sugar is increasing.

Oligosaccharides refer to carbohydrates containing two to ten monosaccharide groups connected by glycoside bonds. Oligosaccharides can exhibit a beneficial effect on intestinal health, such as promotion of selective proliferation of intestinal bifidobacteria and impart a relatively natural texture and sweetness, and thus have been widely used as an alternative to sugar in recent years. However, (1) oligosaccharides have a low sweetness of about 20% to 40% that of sugar, (2) oligosaccharides are easily hydrolyzed by acid or heat, (Jeong-Ryeol Kim et al., 1995, KOREAN J FOOD SCI TECHNOL, VOL. 27, NO. 2, pp. 170~175), (3) oligosaccharides lose health functionalities thereof when hydrolyzed and give the body calories as general saccharides.

In order to improve the storage stability of oligosaccharides, studies on factors affecting oligosaccharide hydrolysis have been conducted (Man-Jin In et al., 2006, J KOREAN SOC APPL BIOL CHEM, VOL. 49(1), pp. 86~89). However, there is no report on how to improve stability of oligosaccharides by mixing carbohydrates.

The present inventors have found that application of allulose to oligosaccharide could increase acid resistance and heat resistance of the oligosaccharide of a sweetener while improving taste of the sweetener, and foods were remarkably improved in taste when the sweetener was added, as compared with when either oligosaccharide or allulose was added, and thus have completed the present invention.

DISCLOSURE

Technical Problem

It is one aspect of the present application to provide a sweetener including an oligosaccharide having increased acid resistance.

It is another aspect of the present application to provide a method of increasing acid resistance of an oligosaccharide of an oligosaccharide-containing sweetener including applying allulose to the oligosaccharide.

It is a further aspect of the present application to provide a food composition including the sweetener according to the present application.

Hereinafter, embodiments of the present application will be described in detail. In addition, descriptions of details apparent to those skilled in the art will be omitted for clarity.

Technical Solution

In accordance with one aspect of the present application, there is provided a sweetener including allulose and an oligosaccharide, wherein the oligosaccharide has an increase in acid resistance.

As used herein, the term "allulose" refers to a C-3 epimer of fructose, which is a kind of ketohexose, a monosaccharide (C6).

As used herein, the term "oligosaccharide" refers to a saccharide polymer generally including 2 to 10 monosaccharides, and examples of the oligosaccharide may include fructooligosaccharide, isomaltooligosaccharide, galactooligosaccharide, xylooligosaccharide, maltooligosaccharide, and gentiooligosaccharide, without being limited thereto. Specifically, the oligosaccharide according to the present application may be fructooligosaccharide or isomaltooligosaccharide, more specifically fructooligosaccharide.

As used herein, the term "acid resistance" refers to stability against acid, specifically, resistance of oligosaccharide to deterioration in inherent properties due to acid. The sweetener according to the present application may have acid resistance at pH 1 to 6, specifically, at pH 2 to 6.

The sweetener according to the present application may have 90 wt % or more oligosaccharide, specifically 90 wt % to 99 wt %, 90 wt % to 95 wt %, or 90.3 wt % to 92.8 wt % as measured after 24 hours of storage at pH 2, based on oligosaccharide weight at 0 hours of storage under the same conditions.

In addition, the sweetener may have 80 wt % or more oligosaccharide, specifically 80 wt % to 99 wt %, 80 wt % to 95 wt %, 80 wt % to 90 wt %, or 82.9 wt % to 86.2 wt %, as measured after 48 hours of storage at pH 2, based on oligosaccharide weight at 0 hours of storage under the same conditions.

In the sweetener according to the present application, the oligosaccharide may have improved heat resistance.

As used herein, the term "heat resistance" refers to stability against heat, specifically, resistance of the oligosaccharide to deterioration in inherent properties due to heat. The sweetener according to the present application may have heat resistance at a temperature of 20° C. to 90° C. Specifically, the sweetener may have heat resistance at a temperature of 20° C. to 85° C., 25° C. to 90° C., 25° C. to 85° C., 50° C. to 90° C., 50° C. to 85° C., 80° C. to 90° C., 80° C. to 85° C., or 85° C.

The sweetener according to the present application may have 30 wt % or more oligosaccharide, specifically 50 wt % or more, 60 wt % or more, 30 wt % to 95 wt %, 30 wt % to 90 wt %, 30 wt % to 85 wt %, 50 wt % to 95 wt %, 50 wt % to 90 wt %, 50 wt % to 85 wt %, 60 wt % to 95 wt %, 60 wt % to 90 wt %, 60 wt % to 85 wt %, or 62.8 wt % to 81.2 wt % oligosaccharide, as measured after 2 hours of storage under conditions of pH 2 and 85° C., based on oligosaccharide weight at 0 hours of storage under the same conditions.

In addition, the sweetener according to the present application may have 10 wt % or more oligosaccharide, specifically 30 wt % or more, 50 wt % or more, 10 wt % to 95 wt %, 10 wt % to 90 wt %, 10 wt % to 80 wt %, 10 wt % to 70 wt %, 30 wt % to 95 wt %, 30 wt % to 90 wt %, 30 wt % to 80 wt %, 30 wt % to 70 wt %, 50 wt % to 95 wt %, 50 wt % to 90 wt %, 50 wt % to 80 wt %, 50 wt % to 70 wt %, or 51.2 wt % to 66.6 wt % oligosaccharide, as measured after 4 hours of storage under conditions of pH 2 and 85° C., based on oligosaccharide weight at 0 hours of storage under the same conditions.

In the sweetener according to the present application, the allulose may be present in an amount of 20 parts by weight to 1000 parts by weight, specifically 30 parts by weight to 1000 parts by weight, 40 parts by weight to 1000 parts by weight, 45 parts by weight to 1000 parts by weight, 30 parts by weight to 900 parts by weight, 40 parts by weight to 900 parts by weight, 45 parts by weight to 900 parts by weight, 30 parts by weight to 800 parts by weight, 40 parts by weight to 800 parts by weight, 45 parts by weight to 800 parts by weight, 30 parts by weight to 750 parts by weight, 40 parts by weight to 750 parts by weight, or 45 parts by weight to 750 parts by weight, relative to 100 parts by weight of the oligosaccharide.

The sweetener according to the present application may be improved in taste. Specifically, the sweetener according to the present application may be improved in sweetness.

The sweetener according to the present application may further include a salt. The salt may include citrates, lactates, carbonates, phosphates, or combinations thereof. Specifically, the salt may be calcium citrate, potassium citrate, sodium citrate, potassium lactate, calcium lactate, sodium lactate, calcium carbonate, potassium carbonate, potassium hydrogen carbonate, sodium carbonate, sodium hydrogen carbonate, monopotassium phosphate, dipotassium phosphate, tripotassium phosphate, calcium hydrogen phosphate, calcium dihydrogen phosphate, tricalcium phosphate, monosodium phosphate, disodium phosphate, trisodium phosphate, or a combination thereof, more specifically sodium citrate, sodium lactate, sodium hydrogen carbonate, or trisodium phosphate.

The salt may be present in an amount of 0.05 parts by weight to 0.5 parts by weight relative to 100 parts by weight of the sweetener. Specifically, the salt may be present in an amount of 0.1 parts by weight to 0.5 parts by weight or 0.1 parts by weight to 0.3 parts by weight relative to 100 parts by weight of the sweetener.

The sweetener according to the present application may be a liquid sweetener, a powdery sweetener, or a granular sweetener, without being limited thereto.

The sweetener according to the present application may further include a sweetening agent other than the oligosaccharide and the allulose, a synthetic preservative, a natural preservative, or a combination thereof. Examples of the sweetening agent other than the oligosaccharide and the allulose may include glucose, fructose, lactose, maltose, sugar, corn syrup, sugar syrup, oligosaccharides, tagatose, xylose, honey, high sweetening agents (for example, steviol glycoside, sucralose, aspartame, acesulfame potassium, saccharin sodium, and the like), dietary fiber, and dextrin, without being limited thereto. Examples of the synthetic preservative may include potassium sorbate, calcium sorbate, sorbic acid, sodium benzoate, benzoic acid, potassium benzoate, calcium benzoate, methyl ρ-oxybenzoate, and ethyl ρ-oxybenzoate, without being limited thereto. Examples of the natural preservative may include grapefruit seed extract, citrus extract, complex gold extract, lactic acid bacterium complex powder, and polylysine, without being limited thereto.

In accordance with another aspect of the present application, there is provided a method of increasing acid resistance of an oligosaccharide of an oligosaccharide-containing sweetener which includes applying allulose to the oligosaccharide. As used herein, the term "applying" includes mixing, adding, coating, and spraying, without being limited thereto. Specifically, the applying may be mixing or adding.

Herein, increase in acid resistance means that the weight of the oligosaccharide measured after the allulose is applied to the oligosaccharide, followed by standing at pH 2 for 24 hours or 48 hours, is increased by 5 wt % or more, 7 wt % or more, 10 wt % or more, or 13 wt % or more, as compared with the weight of the oligosaccharide measured after the oligosaccharide is allowed to stand under the same conditions as above without applying the allulose to the oligosaccharide.

In the method of increasing acid resistance of the oligosaccharide, heat resistance of the oligosaccharide may also be increased.

In the method of increasing acid resistance and heat resistance of the oligosaccharide, increase in acid resistance and heat resistance means that the weight of the oligosaccharide measured after the allulose is applied to the oligosaccharide, followed by standing at pH 2 and 85° C. for 2 hours or 4 hours, is increased by l0 wt % or more, 20 wt % or more, 30 wt % or more, 40 wt % or more, 50 wt % or more, 60 wt % or more, 70 wt % or more, 80 wt % or more, or 90 wt % or more, as compared with the weight of the oligosaccharide measured after the oligosaccharide is allowed to stand under the same conditions as above without applying the allulose to the oligosaccharide.

In the method according to the present application, the allulose may be applied in an amount of 20 parts by weight to 1,000 parts by weight relative to 100 parts by weight of the oligosaccharide. Specifically, the allulose may be added in an amount of 30 parts by weight to 1,000 parts by weight, 40 parts by weight to 1,000 parts by weight, 45 parts by weight to 1,000 parts by weight, 30 parts by weight to 900 parts by weight, 40 parts by weight to 900 parts by weight, 45 parts by weight to 900 parts by weight, 30 parts by weight to 800 parts by weight, 40 parts by weight to 800 parts by weight, 45 parts by weight to 800 parts by weight, 30 parts by weight to 750 parts by weight, 40 parts by weight to 750 parts by weight, or 45 parts by weight to 750 parts by weight, relative to 100 parts by weight of the oligosaccharide.

The method of increasing acid resistance of the oligosaccharide according to the present application may further include applying a salt to the allulose or the oligosaccharide before, after, or simultaneously with applying the allulose to the oligosaccharide. Specifically, the method of increasing acid resistance of the oligosaccharide according to the present application may further include applying a salt to the allulose after applying the allulose to the oligosaccharide.

In the method of increasing acid resistance of the oligosaccharide according to the present application, the salt may be applied in an amount of 0.05 parts by weight to 0.5 parts by weight, specifically 0.1 parts by weight to 0.5 parts by weight or 0.1 parts by weight to 0.3 parts by weight, relative to 100 parts by weight of the sweetener.

In the method of increasing acid resistance and heat resistance of the oligosaccharide, taste of the oligosaccharide may also be improved.

In accordance with a further aspect of the present application, there is provided a food composition including the sweetener including an oligosaccharide having increased acid resistance according to the present application. The food composition according to the present application may include general foods, health foods, and medicinal (or patient) foods, without being limited thereto. Specifically, the food composition may include drinks (e.g., dietary fiber drinks, carbonated water, baked flour soup, etc.), bakery products, sauces (e.g., pork cutlet sauce, etc.), milk products (such as fermented milk), braised foods (e.g., braised quail eggs, braised mackerel, soy sauce braised potatoes, braised black beans, soy sauce braised saury, etc.), rice with beef, stir-fried foods (e.g., stir-fried fish cake, stir-fried eggplant, stir-fried anchovies, stir-fried squid, stir-fried dried squid, stir-fried vegetables, stir-fried beef, etc.), salads (e.g., seasoned raw vegetables, shredded daikon, yellowish overripe cucumber salad, seasoned vegetables, etc.), grilled foods (grilled squid, roasted ribs, grilled rice cake, etc.), syrups, dressing, stir-fried rice cake, bulgogi, steamed chili, kiwi tea, ssamjang, or processed foods.

When the sweetener according to the present application is used in the food composition, the sweetener may be used alone or in combination with other ingredients, and may be suitably used according to a typical method. In addition, the food composition according to the present application may include various flavoring agents or natural carbohydrates as an additional ingredient. Examples of the natural carbohydrates may include monosaccharides such as glucose and fructose, disaccharides such as maltose and sucrose, polysaccharides such as dextrin and cyclodextrin, and sugar alcohols such as xylitol, sorbitol and erythritol. Examples of the flavoring agents may include natural sweetener such as thaumatin and *stevia* extract and synthetic sweetener such as saccharin and aspartame.

Further, the food composition according to the present application may further include various nutrients, vitamins, electrolytes, flavors, colorants, pectin and salts thereof, alginic acid and salts thereof, organic acids, protective colloid thickeners, pH adjusters, stabilizers, preservatives, glycerin, alcohols, carbonating agents used in carbonated drinks, and the like. In addition to these, the food composition according to the present application may contain fruit pulp for natural fruit juices, fruit juice drinks and vegetable drinks. These ingredients may be may be used alone or in combination thereof. These additional ingredients may be present in an amount of 0.01 parts by weight to 0.20 parts by weight relative to 100 parts by weight of the food composition according to the present application.

Since the sweetener used in the food composition includes the sweetener including an oligosaccharide having increased acid resistance according to the present application, a detailed description thereof will be omitted.

In accordance with yet another aspect of the present application, there is provided a method for improving taste of a food, which includes adding a sweetener including allulose and an oligosaccharide to the food.

In the method for improving taste according to the present application, the sweetener may be a sweetener including oligosaccharide having increased acid resistance and/or heat resistance.

In the method for improving taste of a food according to the present application, the allulose may be present in the sweetener in an amount of 20 parts by weight to 1,000 parts by weight, 25 parts by weight to 1,000 parts by weight, 45 parts by weight to 1,000 parts by weight, 100 parts by weight to 1,000 parts by weight, 20 parts by weight to 750 parts by weight, 45 parts by weight to 750 parts by weight, 100 parts by weight to 750 parts by weight, 20 parts by weight to 500 parts by weight, 45 parts by weight to 500 parts by weight, 100 parts by weight to 500 parts by weight, 20 parts by weight to 300 parts by weight, 45 parts by weight to 300 parts by weight, 100 parts by weight to 300 parts by weight, 20 parts by weight to 231 parts by weight, 45 parts by weight to 231 parts by weight, or 100 parts by weight to 231 parts by weight, relative to 100 parts by weight of the oligosaccharide.

In the method for improving taste of a food according to the present application, improvement in taste may be improvement in sweetness.

Since the food has been described in the above food composition is the identical to that in the method for improving taste of the food according to aspects of the present application, detailed description thereof will be omitted.

Advantageous Effects

According to the present application, it is possible to provide a sweetener which includes an oligosaccharide improved in acid resistance, heat resistance, and taste, thereby considerably improving taste of a food when added to the food.

As a result, the sweetener can preserve health functionalities (beneficial effects on intestinal health, etc.) of oligosaccharides, improve stability during storage/distribution, improve taste without causing increase in caloric content, and have increased applicability to foods.

MODE FOR APPLICATION

Hereinafter, the present application will be described in more detail with reference to examples. However, it should be noted that these examples are provided for illustration only and should not be construed in any way as limiting the application.

Example 1. Preparation of Sweetener and Evaluation of Acid Resistance and Heat Resistance 1-1. Preparation of Sweetener Sweeteners (Experimental Examples 1-1, 1-2, 1-3) were prepared as shown in Table 1. Specifically, crystalline allulose (allulose content in solids: 99 wt %, CJ Cheiljedang Co., Ltd.) was dissolved in purified water to a solid content of 75 wt % and then added to an oligosaccharide (Beksul fructooligosaccharide, solid content: 75 wt %, fructooligosaccharide content in solids: 55 wt %, CJ Cheiljedang Co., Ltd.), followed by sufficiently stirring the mixture at 300 rpm at room temperature using a blender (MAZELA Z, EYELA), thereby preparing the sweeteners.

In Comparative Example 1, an oligosaccharide (Beksul fructooligosaccharide, solid content: 75 wt %, fructooligosaccharide content in solids: 55 wt %, CJ Cheiljedang Co., Ltd.) was used.

TABLE 1

| Item | Oligosaccharide Amount (wt %) | Weight of oligosaccharide (g) | Allulose Amount (wt %) | Weight of allulose (g) | Weight of allulose/Weight of oligosaccharide |
|---|---|---|---|---|---|
| Comparative Example 1 | 100 | 41.25 | | | |
| Experimental Example 1-1 | 80 | 33 | 20 | 14.85 | 0.45 |
| Experimental Example 1-2 | 50 | 20.625 | 50 | 37.125 | 1.8 |
| Experimental Example 1-3 | 20 | 8.25 | 80 | 59.4 | 7.2 |

1-2. Experimental Method

Acid resistance was evaluated by adding 30 wt % of an aqueous citric acid solution to each of the sweetener samples prepared in Comparative Example 1 and Experimental Examples 1-1, 1-2, 1-3, adjusting the sample to a pH of 2, and storing the sample at room temperature. Here, the pH was measured using a pH meter (SEVEN COMPACT, METTLER TOLEDO International Inc.) and a high-viscosity sensor (InLab® Viscous Pro-ISM, METTLER TOLEDO International Inc.).

Acid resistance and heat resistance (i.e., complex stability against acid and heat) were evaluated by storing each of the samples at pH 2 and 85° C.

Time-dependent oligosaccharide content was measured by high performance liquid chromatography (HPLC). Specifically, 1 g of each of the samples of Comparative Example 1 and Experimental Examples 1-1, 1-2, 1-3 was placed in a 50 ml measuring flask and then dissolved in distilled water to prepare a 50 ml solution (20 g/L). Then, the solution was filtered through a 0.2 μm filter, thereby preparing a test solution. As a standard solution, a fructooligosaccharide set (295-73401, Wako Chemical) was used. Specifically, 1 g of each of standard products, 1-Kestose (GF2), Nystose (GF3), and 1-Fructofuranosylnystose (GF4) was weighed into a 50 ml measuring flask and dissolved in distilled water, followed by serially diluting the solution to a concentration of 0.3125 g/L to 20 g/L and filtration with a 0.2 μm filter, thereby preparing the standard solution. The prepared test solution and standard solution were analyzed under conditions listed in Table 2 using an HPLC system (Alliance, Waters, e2695 Separation Modules, USA/Waters column Heater Module/RI detector Water 2414/Empower™ Software).

TABLE 2

| Moving bed | Acetonitrile (80%):DW (20%) |
|---|---|
| Column | 4.6 mm × 250 mm KROMASIL 100-5NH2 (KROMASIL) |
| Flow rate | 0.8 ml/min |
| Temperature | 35° C. |
| Dose | 20 μl |
| Detector | Differential refractometer (RID: Refractive Index Detector) |

The oligosaccharide content of each of the samples of Comparative Example 1 and Experimental Examples 1-1 to 1-3 was calculated according to Equation 1, and the oligosaccharide retention rate was calculated according to Equation 2, thereby evaluating stability of oligosaccharides.

Oligosaccharide content (g/100 g)=(Concentration (g/L) of each oligosaccharide component (GF2, GF3, or GF4) determined from calibration curve×Diluted amount (mL)×100)/Weight of sample (g)×1,000  [Equation 1]

Oligosaccharide retention rate (% by weight, hereinafter, %)=(Oligosaccharide content (g/100 g) of sample during storage×100)/Initial oligosaccharide content (g/100 g) of sample  [Equation 2]

Oligosaccharide content and stability analysis of all Comparative Examples and Experimental Examples were carried out in the same manner as above.

1-3. Experiment Result

Acid Resistance

As shown in Table 3, the oligosaccharide (Comparative Example 1) had an oligosaccharide retention rate of 82.3 wt % and 75.6 wt %, as measured after 24 hours and 48 hours of storage under acidic conditions of pH 2 (at room temperature), respectively.

Conversely, the sweeteners with allulose applied to oligosaccharides (Examples 1-1, 1-2, 1-3) had an oligosaccharide retention rate of 90.3 wt % to 92.8 wt % and 82.9 wt % to 86.2 wt %, as measured after 24 hours and 48 hours of storage, respectively, and thus were less degraded in oligosaccharide by about 10% to 15% than the sweetener without allulose. Thus, it was confirmed that acid resistance of oligosaccharides was increased through addition of allulose.

TABLE 3

| | Oligosaccharide retention rate (wt %) | | | | | |
|---|---|---|---|---|---|---|
| Item | 0 hours | 4 hours | 8 hours | 12 hours | 24 hours | 48 hours |
| Comparative Example 1 | 100.0 | 93.4 | 94.3 | 88.1 | 82.3 | 75.6 |
| Experimental Example 1-1 | 100.0 | 98.3 | 98.6 | 90.0 | 92.8 | 82.9 |
| Experimental Example 1-2 | 100.0 | 100.0 | 97.7 | 92.3 | 90.3 | 85.8 |
| Experimental Example 1-3 | 100.0 | 99.3 | 98.9 | 93.7 | 92.5 | 86.2 |

Acid Resistance and Heat Resistance

As shown in Table 4, it can be seen that the sweetener of Comparative Example 1 had an oligosaccharide retention rate of less than 5%, as measured after 4 hours of storage under conditions of pH 2 and 85° C., and the sweeteners of Experimental Examples 1-1, 1-2, 1-3 had an oligosaccharide retention rate of 51.2 wt % to 66.6 wt %. Thus, it was confirmed that the acid resistance and heat resistance were improved by more than 1,000%.

TABLE 4

| Item | Oligosaccharide retention rate (wt %) | | |
|---|---|---|---|
| | 0 hours | 2 hours | 4 hours |
| Comparative Example 1 | 100.0 | 18.0 | 4.8 |
| Experimental Example 1-1 | 100.0 | 62.8 | 51.2 |
| Experimental Example 1-2 | 100.0 | 81.2 | 66.6 |
| Experimental Example 1-3 | 100.0 | 73.9 | 56.3 |

Example 2: Evaluation of Acid Resistance and Heat Resistance of Sweetener Including Oligosaccharide Having Improved Acid Resistance when Adding Salt to Sweetener 2-1. Preparation of Sweetener with Salt Further Added Thereto As shown in Table 5, sweeteners with a salt further added thereto were prepared by adding salts to the sweeteners prepared in Example 1. Specifically, after sweeteners with allulose applied to oligosaccharide were prepared in the same manner as in Example 1, salts were added to the sweeteners, followed by sufficiently mixing the mixture at 300 rpm at room temperature using a blender (MAZELA Z, EYELA), thereby preparing the sweeteners.

Oligosaccharides and allulose were the same as those of Example 1, and, as the salts, sodium citrate (Jungbunzlauer), sodium lactate (Musashino Chemical Lab., Ltd.), sodium hydrogen carbonate and trisodium phosphate (Seodo Bio Natural Ingredients), all of which are commercially available powdery products, were used.

TABLE 5

| | | Amount (wt %) | | | | | | |
|---|---|---|---|---|---|---|---|---|
| Item | Salt | Oligosaccharide | Allulose | Sodium citrate | Sodium lactate | Sodium hydrogen carbonate | Trisodium phosphate | Total |
| Comparative Example 1 | — | 100.00 | | | | | | 100.0 |
| Comparative Example 2-1 | Sodium citrate | 99.85 | | 0.15 | | | | 100.0 |
| Comparative Example 2-2 | Sodium lactate | 99.85 | | | 0.15 | | | 100.0 |
| Comparative Example 2-3 | Sodium hydrogen carbonate | 99.85 | | | | 0.15 | | 100.0 |
| Comparative Example 2-4 | Trisodium phosphate | 99.85 | | | | | 0.15 | 100.0 |
| Experimental Example 1-1 | — | 80.00 | 20.00 | | | | | 100.0 |
| Experimental Example 2-1-1 | Sodium citrate | 79.85 | 20.00 | 0.15 | | | | 100.0 |
| Experimental Example 2-1-2 | Sodium lactate | 79.85 | 20.00 | | 0.15 | | | 100.0 |
| Experimental Example 2-1-3 | Sodium hydrogen carbonate | 79.85 | 20.00 | | | 0.15 | | 100.0 |
| Experimental Example 2-1-4 | Trisodium phosphate | 79.85 | 20.00 | | | | 0.15 | 100.0 |
| Experimental Example 1-2 | — | 50.00 | 50.00 | | | | | 100.0 |
| Experimental Example 2-2-1 | Sodium citrate | 49.85 | 50.00 | 0.15 | | | | 100.0 |
| Experimental Example 2-2-2 | Sodium lactate | 49.85 | 50.00 | | 0.15 | | | 100.0 |
| Experimental Example 2-2-3 | Sodium hydrogen carbonate | 49.85 | 50.00 | | | 0.15 | | 100.0 |
| Experimental Example 2-2-4 | Trisodium phosphate | 49.85 | 50.00 | | | | 0.15 | 100.0 |
| Experimental Example 1-3 | — | 20.00 | 80.00 | | | | | 100.0 |
| Experimental Example 2-3-1 | Sodium citrate | 19.85 | 80.00 | 0.15 | | | | 100.0 |
| Experimental Example 2-3-2 | Sodium lactate | 19.85 | 80.00 | | 0.15 | | | 100.0 |
| Experimental Example 2-3-3 | Sodium hydrogen carbonate | 19.85 | 80.00 | | | 0.15 | | 100.0 |
| Experimental Example 2-3-4 | Trisodium phosphate | 19.85 | 80.00 | | | | 0.15 | 100.0 |

2-2. Experimental Method

Evaluation of the acid resistance, heat resistance, and time-dependent content of oligosaccharides and the oligosaccharide retention rate were performed in the same manner as in Example 1.

2-3. Experiment Result

Acid Resistance

As shown in Table 6, it can be seen that the sweeteners further containing a salt (Experimental Examples 2-1-1 to 2-1-4, 2-2-1 to 2-2-4, and 2-3-1 to 2-3-4) had an oligosaccharide retention rate of 90 wt % or higher, as measured after 48 hours of storage under acidic conditions of pH 2 (at room temperature) and thus exhibited an oligosaccharide degradation rate of 10 wt % or less.

Conversely, as in Example 1, the oligosaccharide (Comparative Example 1) had an oligosaccharide retention rate of 75.6 wt %, as measured under the same conditions as above, and the sweeteners obtained by adding allulose to the sweetener of Comparative Example 1 (Experimental Examples 1-1, 1-2, 1-3) had an oligosaccharide retention rate of less than 90 wt %.

Thus, it was confirmed that the acid resistance could be improved more when a salt was further added than when only allulose was added to oligosaccharides.

TABLE 6

| Item | Oligosaccharide retention rate (wt %) | | | | | |
|---|---|---|---|---|---|---|
| | 0 hours | 4 hours | 8 hours | 12 hours | 24 hours | 48 hours |
| Comparative Example 1 | 100.0 | 93.4 | 94.3 | 88.1 | 82.3 | 75.6 |
| Comparative Example 2-1 | 100.0 | 97.7 | 96.0 | 93.6 | 88.8 | 86.7 |
| Comparative Example 2-2 | 100.0 | 96.6 | 97.0 | 95.1 | 89.0 | 84.6 |
| Comparative Example 2-3 | 100.0 | 95.7 | 93.9 | 90.5 | 88.6 | 83.6 |
| Comparative Example 2-4 | 100.0 | 98.6 | 93.3 | 92.3 | 88.8 | 82.6 |
| Experimental Example 1-1 | 100.0 | 98.3 | 98.6 | 90.0 | 92.8 | 82.9 |
| Experimental Example 2-1-1 | 100.0 | 99.3 | 95.3 | 95.8 | 95.2 | 93.2 |
| Experimental Example 2-1-2 | 100.0 | 100.0 | 99.5 | 93.4 | 95.5 | 91.1 |
| Experimental Example 2-1-3 | 100.0 | 98.3 | 95.9 | 95.8 | 97.8 | 95.8 |
| Experimental Example 2-1-4 | 100.0 | 100.0 | 98.6 | 99.8 | 99.8 | 95.7 |
| Experimental Example 1-2 | 100.0 | 100.0 | 97.7 | 92.3 | 90.3 | 85.8 |
| Experimental Example 2-2-1 | 100.0 | 96.9 | 100.0 | 95.4 | 93.4 | 92.2 |
| Experimental Example 2-2-2 | 100.0 | 100.0 | 99.9 | 93.8 | 91.2 | 90.1 |
| Experimental Example 2-2-3 | 100.0 | 100.0 | 99.7 | 89.8 | 94.4 | 93.4 |
| Experimental Example 2-2-4 | 100.0 | 98.0 | 99.1 | 96.7 | 97.1 | 93.5 |
| Experimental Example 1-3 | 100.0 | 99.3 | 98.9 | 93.7 | 92.5 | 86.2 |
| Experimental Example 2-3-1 | 100.0 | 98.9 | 95.2 | 95.6 | 99.3 | 95.9 |
| Experimental Example 2-3-2 | 100.0 | 100.0 | 96.9 | 97.4 | 95.1 | 95.0 |
| Experimental Example 2-3-3 | 100.0 | 100.0 | 100.0 | 98.7 | 100.0 | 99.5 |
| Experimental Example 2-3-4 | 100.0 | 97.9 | 98.7 | 94.6 | 96.4 | 91.2 |

Acid Resistance and Heat Resistance

As shown in Table 7, it can be seen that the sweeteners of Experimental Examples 1-2 to 1-5, 2-2 to 2-5, and 3-2 to 3-5 had an oligosaccharide retention rate of 75.6% to 95.5%, as measured after 4 hours of storage under conditions of pH 2 and 85° C. based on oligosaccharide weight at 0 hours of storage under the same conditions. That is, the sweeteners had an oligosaccharide retention rate which is 1,575% to 1,990% that of Comparative Example 1 and is increased by 14% to 86%, as compared with Experimental Examples 1-1, 1-2, and 1-3.

Thus, it was confirmed that acid resistance and heat resistance could be improved more when a salt was further added than when only allulose was added to oligosaccharides.

TABLE 7

| Item | Oligosaccharide retention rate (wt %) | | |
|---|---|---|---|
| | 0 hours | 2 hours | 4 hours |
| Comparative Example 1 | 100.0 | 18.0 | 4.8 |
| Comparative Example 2-1 | 100.0 | 78.6 | 65.8 |
| Comparative Example 2-2 | 100.0 | 81.8 | 63.2 |
| Comparative Example 2-3 | 100.0 | 84.5 | 70.2 |
| Comparative Example 2-4 | 100.0 | 77.7 | 57.4 |
| Experimental Example 1-1 | 100.0 | 62.8 | 51.2 |
| Experimental Example 2-1-1 | 100.0 | 100.0 | 93.0 |
| Experimental Example 2-1-2 | 100.0 | 86.4 | 80.3 |
| Experimental Example 2-1-3 | 100.0 | 96.0 | 95.5 |
| Experimental Example 2-1-4 | 100.0 | 100.0 | 89.5 |
| Experimental Example 1-2 | 100.0 | 81.2 | 66.6 |
| Experimental Example 2-2-1 | 100.0 | 97.3 | 94.8 |
| Experimental Example 2-2-2 | 100.0 | 93.8 | 87.1 |
| Experimental Example 2-2-3 | 100.0 | 95.0 | 92.1 |
| Experimental Example 2-2-4 | 100.0 | 94.6 | 90.0 |
| Experimental Example 1-3 | 100.0 | 73.9 | 56.3 |
| Experimental Example 2-3-1 | 100.0 | 92.8 | 80.4 |
| Experimental Example 2-3-2 | 100.0 | 88.9 | 75.6 |
| Experimental Example 2-3-3 | 100.0 | 96.6 | 90.3 |
| Experimental Example 2-3-4 | 100.0 | 97.2 | 90.6 |

Example 3: Change in Acid Resistance and Heat Resistance with Varying Amount of Salt 3-1. Preparation of Sweetener and Experimental Method Sweeteners were prepared in the same manner as in Example 2 except that the amounts of salts were changed as listed in Table 8.

TABLE 8

| Item | Salt | Oligosaccharide | Allulose | Sodium citrate | Sodium lactate | Sodium hydrogen carbonate | Trisodium phosphate | Total |
|---|---|---|---|---|---|---|---|---|
| Comparative Example 3 (Experimental Example1-2) | — | 50.00 | 50.00 | | | | | 100.0 |
| Experimental Example 3-1-A | Sodium citrate | 49.95 | 50.00 | 0.05 | | | | 100.0 |
| Experimental Example 3-1-B | Sodium citrate | 49.90 | 50.00 | 0.10 | | | | 100.0 |
| Experimental Example 3-1-C | Sodium citrate | 49.70 | 50.00 | 0.30 | | | | 100.0 |
| Experimental Example 3-1-D | Sodium citrate | 49.50 | 50.00 | 0.50 | | | | 100.0 |
| Experimental Example 3-2-A | Sodium lactate | 49.95 | 50.00 | | 0.05 | | | 100.0 |
| Experimental Example 3-2-B | Sodium lactate | 49.90 | 50.00 | | 0.10 | | | 100.0 |
| Experimental Example 3-2-C | Sodium lactate | 49.70 | 50.00 | | 0.30 | | | 100.0 |
| Experimental Example 3-2-D | Sodium lactate | 49.50 | 50.00 | | 0.50 | | | 100.0 |
| Experimental Example 3-3-A | Sodium hydrogen carbonate | 49.95 | 50.00 | | | 0.05 | | 100.0 |
| Experimental Example 3-3-B | Sodium hydrogen carbonate | 49.90 | 50.00 | | | 0.10 | | 100.0 |
| Experimental Example 3-3-C | Sodium hydrogen carbonate | 49.70 | 50.00 | | | 0.30 | | 100.0 |
| Experimental Example 3-3-D | Sodium hydrogen carbonate | 49.50 | 50.00 | | | 0.50 | | 100.0 |
| Experimental Example 3-4-A | Trisodium phosphate | 49.95 | 50.00 | | | | 0.05 | 100.0 |
| Experimental Example 3-4-B | Trisodium phosphate | 49.90 | 50.00 | | | | 0.10 | 100.0 |
| Experimental Example 3-4-C | Trisodium phosphate | 49.70 | 50.00 | | | | 0.30 | 100.0 |
| Experimental Example 3-4-D | Trisodium phosphate | 49.50 | 50.00 | | | | 0.50 | 100.0 |

As Comparative Example 3, Experimental Example 2-1, having the highest acid resistance and heat resistance, was selected based on the results of Examples 1 and 2.

3-2. Experiment Result

Acid Resistance

As shown in Table 9, it can be seen that the sweeteners of Experimental Example group A (3-1-A, 3-2-A, 3-3-A and 3-4-A) each containing a salt (sodium citrate, sodium lactate, sodium hydrogen carbonate, or trisodium phosphate) in an amount of 0.05 wt % based on the total weight of the sweetener had an average oligosaccharide retention rate of 86.7 wt %, as measured after 48 hours of storage under conditions of pH 2 (at room temperature) and thus were slightly increased in acid resistance, as compared with Comparative Example 3 (Experimental Example 2-1) having an oligosaccharide retention rate of 85.8 wt %. In addition, it can be seen that the sweeteners of Experimental Example groups B, C, and D each containing a salt in an amount of 0.10 wt % or more based on the total weight of the sweetener had an average oligosaccharide retention rate of 92.3 wt %, 92.2 wt %, and 91.1 wt %, respectively, and thus were remarkably increased in acid resistance, as compared with Comparative Example 3 having the highest acid resistance among the sweeteners of Example 1.

TABLE 9

| | Oligosaccharide retention rate (wt %) | | | | | |
|---|---|---|---|---|---|---|
| Item | 0 hours | 4 hours | 8 hours | 12 hours | 24 hours | 48 hours |
| Comparative Example 3 (Experimental Example 1-2) | 100.0 | 100.0 | 97.7 | 92.3 | 90.3 | 85.8 |
| Experimental Example 3-1-A | 100.0 | 96.6 | 98.2 | 95.0 | 89.5 | 87.0 |
| Experimental Example 3-1-B | 100.0 | 99.3 | 99.8 | 96.6 | 93.4 | 92.2 |
| Experimental Example 3-1-C | 100.0 | 100.0 | 97.1 | 96.5 | 92.8 | 90.6 |
| Experimental Example 3-1-D | 100.0 | 99.6 | 99.2 | 100.0 | 96.0 | 93.9 |
| Experimental Example 3-2-A | 100.0 | 97.1 | 94.4 | 92.4 | 90.4 | 86.4 |
| Experimental Example 3-2-B | 100.0 | 100.0 | 97.6 | 94.9 | 91.9 | 90.1 |
| Experimental Example 3-2-C | 100.0 | 96.0 | 95.1 | 94.9 | 93.3 | 91.4 |
| Experimental Example 3-2-D | 100.0 | 97.1 | 96.8 | 95.0 | 92.3 | 88.9 |
| Experimental Example 3-3-A | 100.0 | 99.8 | 95.4 | 93.0 | 89.7 | 88.7 |
| Experimental Example 3-3-B | 100.0 | 99.7 | 99.7 | 97.1 | 94.4 | 93.4 |

TABLE 9-continued

| Item | Oligosaccharide retention rate (wt %) | | | | | |
|---|---|---|---|---|---|---|
| | 0 hours | 4 hours | 8 hours | 12 hours | 24 hours | 48 hours |
| Experimental Example 3-3-C | 100.0 | 100.0 | 99.4 | 97.2 | 95.6 | 94.5 |
| Experimental Example 3-3-D | 100.0 | 98.5 | 98.8 | 95.0 | 92.7 | 91.5 |
| Experimental Example 3-4-A | 100.0 | 98.9 | 94.7 | 91.5 | 88.0 | 84.6 |
| Experimental Example 3-4-B | 100.0 | 98.0 | 99.1 | 96.7 | 94.7 | 93.5 |
| Experimental Example 3-4-C | 100.0 | 98.0 | 97.3 | 95.1 | 94.8 | 92.5 |
| Experimental Example 3-4-D | 100.0 | 98.6 | 96.9 | 94.8 | 93.1 | 90.1 |

Acid Resistance and Heat Resistance

As shown in Table 10, it can be seen that the sweeteners of Experimental Example A group (3-1-A, 3-2-A, 3-3-A and 3-4-A) each containing a salt in an amount of 0.05 wt % based on the total weight of the sweetener had an average oligosaccharide retention rate of 86.9%, as measured after 4 hours of storage under conditions of pH 2 and 85° C., and thus had degradation of oligosaccharide suppressed by 20% or more, as compared with Comparative Example 3 (Experimental Example 2-1) having an oligosaccharide retention rate of 66.6%, as measured under the same conditions as above. In addition, it can be seen that the sweeteners of Experimental Example groups B, C, and D each containing a salt in an amount of 0.10 wt % or more based on the total weight of the sweetener had an average oligosaccharide retention rate of 91.0%, 93.4%, and 95.4%, respectively, and thus exhibited an oligosaccharide degradation rate of less than 10%.

Thus, it was confirmed that, when a salt was added in an amount of 0.05 wt % or more based on the total weight of the sweetener, acid resistance and heat resistance were significantly increased, and when a salt was added in an amount of 0.10 wt % or more based on the total weight of the sweetener, the oligosaccharide degradation rate was reduced to 2% to 13%, such that the sweetener could be more stable against acid and heat.

TABLE 10

| Item | Oligosaccharide retention rate (wt %) | | |
|---|---|---|---|
| | 0 hours | 2 hours | 4 hours |
| Comparative Example 3 (Experimental Example 1-2) | 100.0 | 81.2 | 66.6 |
| Experimental Example 3-1-A | 100.0 | 97.8 | 95.8 |
| Experimental Example 3-1-B | 100.0 | 97.3 | 94.8 |
| Experimental Example 3-1-C | 100.0 | 98.4 | 98.0 |
| Experimental Example 3-1-D | 100.0 | 97.4 | 96.4 |
| Experimental Example 3-2-A | 100.0 | 90.6 | 84.6 |
| Experimental Example 3-2-B | 100.0 | 93.8 | 87.1 |
| Experimental Example 3-2-C | 100.0 | 95.7 | 93.4 |
| Experimental Example 3-2-D | 100.0 | 96.1 | 93.9 |
| Experimental Example 3-3-A | 100.0 | 91.2 | 85.1 |
| Experimental Example 3-3-B | 100.0 | 95.0 | 92.1 |
| Experimental Example 3-3-C | 100.0 | 97.6 | 93.0 |
| Experimental Example 3-3-D | 100.0 | 95.8 | 96.0 |
| Experimental Example 3-4-A | 100.0 | 89.7 | 82.0 |
| Experimental Example 3-4-B | 100.0 | 94.6 | 90.0 |
| Experimental Example 3-4-C | 100.0 | 94.5 | 89.1 |
| Experimental Example 3-4-D | 100.0 | 97.0 | 95.4 |

Example 4: Evaluation of Palatability of Sweetener Having Increased Acid Resistance A sensory evaluation was performed to check whether a sweetener increased in acid resistance through application of allulose to oligosaccharide can be improved in sensory quality (palatability or preference).

As shown in Table 11, a sensory test was conducted on Experimental Examples 1-1 to 1-3 and Examples 4-1 to 4-3 obtained by replacing oligosaccharides with isomaltooligosaccharide (Beksul isomaltooligosaccharide, solid content: 75 wt %, isomaltooligosaccharide content in solids: 55 wt %). As Comparative Examples, fructooligosaccharide (Comparative Example 1), isomaltooligosaccharide (Comparative Example 4-1), and allulose (Comparative Example 4-2) were used. Here, the fructooligosaccharide and the allulose were the same as those of Example 1.

TABLE 11

| | Fructooligosaccharide | | Isomaltooligosaccharide | | Allulose | | Weight of allulose/Weight of oligosaccharide |
|---|---|---|---|---|---|---|---|
| | Amount (wt %) | Content of oligosaccharide (g) | Amount (wt %) | Content of oligosaccharide (g) | Amount (wt %) | Content of allulose (g) | |
| Comparative Example 1 | 100 | 41.25 | | | | | |
| Comparative Example 4-1 | | | 100 | 41.25 | | | |
| Comparative Example 4-2 | | | | | 100 | 74.25 | |

TABLE 11-continued

|  | Fructooligosaccharide | | Isomaltooligosaccharide | | Allulose | | Weight of allulose/Weight of oligosaccharide |
|---|---|---|---|---|---|---|---|
|  | Amount (wt %) | Content of oligosaccharide (g) | Amount (wt %) | Content of oligosaccharide (g) | Amount (wt %) | Content of allulose (g) |  |
| Experimental Example 1-1 | 80 | 33 |  |  | 20 | 14.85 | 0.45 |
| Experimental Example 1-2 | 50 | 20.63 |  |  | 50 | 37.125 | 1.8 |
| Experimental Example 1-3 | 20 | 8.25 |  |  | 80 | 59.4 | 7.2 |
| Experimental Example 4-1 |  |  | 80 | 33 | 20 | 14.85 | 0.45 |
| Experimental Example 4-2 |  |  | 50 | 20.63 | 50 | 37.125 | 1.8 |
| Experimental Example 4-3 |  |  | 20 | 8.25 | 80 | 59.4 | 7.2 |

Each of the sweeteners was diluted to a concentration of 12 Brix % with purified water and adjusted to a temperature of 20° C., thereby preparing a sample. The prepared samples were subjected to sensory evaluation for each item by 15 trained male and female panelists in the 20 to 50 age group. Specifically, the prepared samples (Comparative Examples 4-1 to 4-2, Experimental Examples 1-1 to 1-3, Experimental Examples 4-1 to 4-3) were numbered using a random number table, randomly selected one by one, and given to each panelist. In order to prevent interference between samples, a set of samples including fructooligosaccharide (Comparative Example 1), allulose (Comparative Example 4-2), and sweeteners with allulose applied to fructooligosaccharide (Experimental Examples 1-1 to 1-3) was first subjected to sensory evaluation, and another set of samples including isomaltooligosaccharide (Comparative Example 4-1), allulose (Comparative Example 4-2), and sweetener with allulose applied to isomaltooligosaccharide (Experimental Examples 4-1 to 4-3) was subjected to sensory evaluation.

Here, the sensory evaluation was performed by a procedure in which each panelist expressed the sweetness preference and overall preference of the samples after ingestion on a 9 point scale. The quantified scores for each evaluation item were converted into a 5-point scale (intensity; 1 point-very weak to 5 points-very strong, preference; 1 point-very poor to 5 points-very good). Results are shown in Table 12.

Experimental Examples 1-1 to 1-3 and Experimental Examples 4-1 to 4-3 were compared with Comparative Example 1 and Comparative Example 4-1, respectively, thereby analyzing a statistically significant difference ($p<0.05$) of the scores for each item. Statistical analysis was also performed in accordance with the T-test with the corresponding Comparative Example for each Experimental example.

TABLE 12

|  | Comparative Example 1 | Comparative Example 4-2 | Experimental Example 1-1 | Experimental Example 1-2 | Experimental Example 1-3 |
|---|---|---|---|---|---|
| Overall preference | 2.7 ± 0.7 | 3.3 ± 0.7 | 3.4 ± 0.8* | 4.1 ± 0.6* | 4.1 ± 0.7* |
| Sweetness preference | 2.7 ± 0.8 | 3.4 ± 0.8 | 3.4 ± 0.8* | 4.1 ± 0.8* | 4.2 ± 0.6* |

|  | Comparative Example 4-1 | Comparative Example 4-2 | Example 4-1 | Example 4-2 | Example 4-3 |
|---|---|---|---|---|---|
| Overall preference | 2.0 ± 0.6 | 3.4 ± 0.9 | 2.8 ± 0.8* | 3.5 ± 0.7* | 3.9 ± 0.8* |
| Sweetness preference | 2.1 ± 0.7 | 3.5 ± 0.9 | 2.8 ± 0.5* | 3.4 ± 0.6* | 3.9 ± 0.6* |

In Table 12, *indicates statistical significance.

As a result of sensory evaluation, it was confirmed that the sweeteners obtained by adding allulose to oligosaccharides were increased in sweetness preference and remarkably improved in overall preference.

Example 5: Application of Sweetener to Food and Evaluation of Palatability 5-1. Bakery Food Cake sheets (sponge cakes) were prepared according to the formulations as listed in Table 13, followed by performing sensory evaluation. Results are shown in Table 14. In Example 5, the content of each ingredient is based on weight. That is, the content of each ingredient is the number of grams per 100 g (wt %).

Each of the prepared cake sheets was allowed to stand at room temperature for 1 day, numbered using a random number table, and then subjected to sensory evaluation for each item by 15 trained male and female panelists in the 20 to 50 age group. In order to prevent interference between samples, a set of samples was first prepared using fructooligosaccharide (Comparative Example 5-1), allulose (Comparative Example 5-3), and sweeteners obtained by applying allulose to fructooligosaccharide (Experimental Examples 5-1, 5-2, 5-3, 5-4). Composition of each of the cake sheets is shown in Table 13. Then, another set of samples was prepared using isomaltooligosaccharide (Comparative Example 5-2), allulose (Comparative Example 5-3), and sweeteners obtained by applying allulose to isomaltooligosaccharide (Experimental Example 5-5, 5-6, 5-7, 5-8), followed by sensory evaluation for each sample set.

Here, sensory evaluation was performed by a procedure in which each panelist expressed the intensity of sweetness and preference of the samples (cake sheets) after ingestion on a 5 point scale.

TABLE 13

| Ingredient (wt %) | Comparative Example 5-1 | Comparative Example 5-2 | Comparative Example 5-3 | Experimental Example 5-1 | Experimental Example 5-2 | Experimental Example 5-3 | Experimental Example 5-4 | Experimental Example 5-5 | Experimental Example 5-6 | Experimental Example 5-7 | Experimental Example 5-8 |
|---|---|---|---|---|---|---|---|---|---|---|---|
| Purified water | 0.6 | 0.6 | 0.6 | 0.6 | 0.6 | 0.6 | 0.6 | 0.6 | 0.6 | 0.6 | 0.6 |
| White sugar | 14.3 | 14.3 | 14.3 | 14.3 | 14.3 | 14.3 | 14.3 | 14.3 | 14.3 | 14.3 | 14.3 |
| Fructooligosaccharide | 17.9 | | | 16.1 | 12.5 | 8.9 | 5.4 | | | | |
| Isomaltooligosaccharide | | 17.9 | | | | | | 16.1 | 12.5 | 8.9 | 5.4 |
| Allulose | | | 17.9 | 1.8 | 5.4 | 8.9 | 12.5 | 1.8 | 5.4 | 8.9 | 12.5 |
| Weight of allulose/Weight of oligosaccharide | — | — | — | 0.111 | 0.432 | 1 | 2.31 | 0.111 | 0.432 | 1 | 2.31 |
| Egg | 40.9 | 40.9 | 40.9 | 40.9 | 40.9 | 40.9 | 40.9 | 40.9 | 40.9 | 40.9 | 40.9 |
| Weak flour | 24.5 | 24.5 | 24.5 | 24.5 | 24.5 | 24.5 | 24.5 | 24.5 | 24.5 | 24.5 | 24.5 |
| Baking powder | 0.3 | 0.3 | 0.3 | 0.3 | 0.3 | 0.3 | 0.3 | 0.3 | 0.3 | 0.3 | 0.3 |
| Emulsifier | 1.2 | 1.2 | 1.2 | 1.2 | 1.2 | 1.2 | 1.2 | 1.2 | 1.2 | 1.2 | 1.2 |
| Purified salt | 0.3 | 0.3 | 0.3 | 0.3 | 0.3 | 0.3 | 0.3 | 0.3 | 0.3 | 0.3 | 0.3 |

TABLE 14

| | Comparative Example 5-1 | Comparative Example 5-2 | Experimental Example 5-1 | Experimental Example 5-2 | Experimental Example 5-3 | Experimental Example 5-4 |
|---|---|---|---|---|---|---|
| Overall preference | 2.5 ± 0.8 | 2.3 ± 0.8 | 2.5 ± 0.6 | 3.3 ± 0.8* | 3.6 ± 0.8* | 4.1 ± 0.7* |
| Sweetness preference | 2.4 ± 0.6 | 3.4 ± 0.7 | 2.4 ± 0.7 | 2.9 ± 0.8* | 3.5 ± 0.6* | 4.0 ± 0.7* |
| Intensity of sweetness | 2.5 ± 0.8 | 3.8 ± 0.8 | 2.6 ± 0.8 | 3.0 ± 0.7 | 3.4 ± 0.7* | 3.8 ± 0.7* |
| Aftertaste preference | 2.6 ± 0.5 | 2.0 ± 0.5 | 2.5 ± 0.7 | 3.3 ± 0.7* | 3.6 ± 0.6* | 4.1 ± 0.7* |
| Mouthfeel preference | 2.8 ± 0.7 | 2.3 ± 0.7 | 2.6 ± 0.5 | 3.3 ± 0.9 | 3.6 ± 0.6* | 3.5 ± 0.8* |

| | Comparative Example 5-1 | Comparative Example 5-3 | Experimental Example 5-5 | Experimental Example 5-6 | Experimental Example 5-7 | Experimental Example 5-8 |
|---|---|---|---|---|---|---|
| Overall preference | 2.3 ± 0.8 | 2.4 ± 0.6 | 2.3 ± 0.8 | 2.3 ± 0.9 | 2.7 ± 0.9 | 3.4 ± 0.9* |
| Sweetness preference | 2.0 ± 0.7 | 3.2 ± 0.9 | 2.1 ± 0.9 | 2.3 ± 0.7 | 2.7 ± 0.6* | 2.9 ± 0.7* |
| Intensity of sweetness | 2.3 ± 0.7 | 3.9 ± 0.8 | 2.4 ± 0.6 | 2.5 ± 0.6 | 2.7 ± 0.5* | 3.1 ± 0.6* |
| Aftertaste preference | 2.3 ± 0.8 | 1.7 ± 0.7 | 2.2 ± 1.0 | 2.3 ± 0.5 | 2.6 ± 0.7 | 3.4 ± 0.6* |
| Mouthfeel preference | 2.5 ± 0.7 | 2.0 ± 0.8 | 2.7 ± 0.8 | 2.8 ± 0.8 | 2.9 ± 0.6 | 3.3 ± 0.5* |

As a result of sensory evaluation, it was confirmed that the cake sheets prepared using the sweeteners obtained by applying allulose to oligosaccharides were increased in intensity of sweetness, sweetness preference, and overall preference as well as in aftertaste preference and mouthfeel preference, as compared with the cake sheets prepared using either oligosaccharide or allulose.

5-2. Beverage

Dietary fiber drinks were prepared according to the formulations as listed in Table 15, followed by performing sensory evaluation. Results are shown in Table 16.

Each of the prepared dietary fiber drinks was refrigerated for 1 day, numbered using a random number table, and then subjected to sensory evaluation for each item by 15 trained male and female panelists in the 20 to 50 age group. Interference between samples was prevented in the same manner as in Example 5-1.

TABLE 15

| Ingredient (wt %) | Comparative Example 5-4 | Comparative Example 5-5 | Comparative Example 5-6 | Experimental Example 5-9 | Experimental Example 5-10 | Experimental Example 5-11 | Experimental Example 5-12 | Experimental Example 5-13 | Experimental Example 5-14 |
|---|---|---|---|---|---|---|---|---|---|
| Purified water | 85.82 | 85.82 | 85.82 | 85.82 | 85.82 | 85.82 | 85.82 | 85.82 | 85.82 |
| Fructooligosaccharide | 9.65 | | | 7.72 | 4.83 | 2.90 | | | |
| Isomaltooligosaccharide | | 9.65 | | | | | 7.72 | 4.83 | 2.90 |
| Allulose | | | 9.65 | 1.93 | 4.83 | 6.76 | 1.93 | 4.83 | 6.76 |
| Weight of allulose/Weight of oligosaccharide | — | — | — | 0.25 | 1 | 2.33 | 0.24 | 1 | 2.33 |
| Water soluble dietary fiber | 4.00 | 4.00 | 4.00 | 4.00 | 4.00 | 4.00 | 4.00 | 4.00 | 4.00 |
| Enzymatically modified stevia glucosyl stevia | 0.02 | 0.02 | 0.02 | 0.02 | 0.02 | 0.02 | 0.02 | 0.02 | 0.02 |
| Citric acid | 0.25 | 0.25 | 0.25 | 0.25 | 0.25 | 0.25 | 0.25 | 0.25 | 0.25 |
| Sodium citrate | 0.06 | 0.06 | 0.06 | 0.06 | 0.06 | 0.06 | 0.06 | 0.06 | 0.06 |
| Vitamin C | 0.08 | 0.08 | 0.08 | 0.08 | 0.08 | 0.08 | 0.08 | 0.08 | 0.08 |
| DL-Alanine | 0.02 | 0.02 | 0.02 | 0.02 | 0.02 | 0.02 | 0.02 | 0.02 | 0.02 |
| Flavor | 0.10 | 0.10 | 0.10 | 0.10 | 0.10 | 0.10 | 0.10 | 0.10 | 0.10 |

TABLE 16

| | Comparative Example 5-4 | Comparative Example 5-5 | Experimental Example 5-9 | Experimental Example 5-10 | Experimental Example 5-11 |
|---|---|---|---|---|---|
| Overall preference | 3.0 ± 0.5 | 3.3 ± 0.6 | 3.7 ± 0.5* | 4.1 ± 0.5* | 3.9 ± 0.5* |
| Sweetness preference | 2.9 ± 0.5 | 3.4 ± 0.8 | 3.3 ± 0.4 | 3.6 ± 0.3* | 3.9 ± 0.4* |
| Intensity of sweetness | 2.8 ± 0.4 | 3.8 ± 0.5 | 3.1 ± 0.5 | 3.6 ± 0.5* | 3.9 ± 0.7* |
| Aftertaste preference | 2.8 ± 0.7 | 2.6 ± 0.5 | 2.9 ± 0.4 | 3.2 ± 0.5 | 3.5 ± 0.3* |

| | Comparative Example 5-4 | Comparative Example 5-6 | Experimental Example 5-12 | Experimental Example 5-13 | Experimental Example 5-14 |
|---|---|---|---|---|---|
| Overall preference | 2.5 ± 0.6 | 3.5 ± 0.5 | 3.1 ± 0.5* | 3.9 ± 0.6* | 3.8 ± 0.5* |
| Sweetness preference | 2.2 ± 0.6 | 3.4 ± 0.7 | 2.8 ± 0.4* | 3.5 ± 0.4* | 3.7 ± 0.4* |
| Sweetness | 2.1 ± 0.5 | 3.7 ± 0.4 | 2.8 ± 0.5* | 3.4 ± 0.2* | 3.6 ± 0.4* |
| Aftertaste preference | 2.4 ± 0.6 | 2.6 ± 0.5 | 2.7 ± 0.4 | 3.3 ± 0.3* | 3.1 ± 0.2* |

In Table 16, *indicates statistical significance.

As a result of the sensory evaluation, it was confirmed that the dietary fiber drinks prepared using the sweeteners obtained by applying allulose to oligosaccharide were increased in intensity of sweet taste, sweetness preference, and overall preference as well as in aftertaste preference, as compared with the dietary fiber drinks prepared using either oligosaccharide or allulose.

5-3. Sauce

Pork cutlet sauces were prepared according to the formulations as listed in Table 17, followed by performing sensory evaluation. Results are shown in Table 18.

Each of the prepared pork cutlet sauces was allowed to stand at room temperature for 1 day, numbered using a random number table, and then subjected to sensory evaluation for each item by 15 trained male and female panelists in the 20 to 50 age group. Here, commercially available frozen pork was cooked and served with the prepared pork cutlet sauces. Interference between samples was prevented in the same manner as in Example 5-1.

TABLE 17

| Ingredient (wt %) | Comparative Example 5-7 | Comparative Example 5-8 | Comparative Example 5-9 | Experimental Example 5-15 | Experimental Example 5-16 | Experimental Example 5-17 | Experimental Example 5-18 | Experimental Example 5-19 | Experimental Example 5-20 |
|---|---|---|---|---|---|---|---|---|---|
| Purified water | 41.94 | 41.94 | 41.94 | 41.94 | 41.94 | 41.94 | 41.94 | 41.94 | 41.94 |
| Fructooligosaccharide | 25.50 | | | 20.40 | 12.75 | 7.65 | | | |
| Isomaltooligosaccharide | | 25.50 | | | | | 20.40 | 12.75 | 7.65 |
| Allulose | | | 25.50 | 5.10 | 12.75 | 17.85 | 5.10 | 12.75 | 17.85 |
| Weight of allulose/Weight of oligosaccharide | — | — | — | 0.25 | 1 | 2.33 | 0.25 | 1 | 2.33 |
| Tomato paste | 12.00 | 12.00 | 12.00 | 12.00 | 12.00 | 12.00 | 12.00 | 12.00 | 12.00 |
| White vinegar | 7.00 | 7.00 | 7.00 | 7.00 | 7.00 | 7.00 | 7.00 | 7.00 | 7.00 |
| Usta sauce | 6.20 | 6.20 | 6.20 | 6.20 | 6.20 | 6.20 | 6.20 | 6.20 | 6.20 |
| Purified salt | 2.30 | 2.30 | 2.30 | 2.30 | 2.30 | 2.30 | 2.30 | 2.30 | 2.30 |
| Anhydrous crystalline glucose | 2.00 | 2.00 | 2.00 | 2.00 | 2.00 | 2.00 | 2.00 | 2.00 | 2.00 |
| Modified food starch | 2.00 | 2.00 | 2.00 | 2.00 | 2.00 | 2.00 | 2.00 | 2.00 | 2.00 |
| Caramel | 0.42 | 0.42 | 0.42 | 0.42 | 0.42 | 0.42 | 0.42 | 0.42 | 0.42 |
| Anhydrous citric acid | 0.41 | 0.41 | 0.41 | 0.41 | 0.41 | 0.41 | 0.41 | 0.41 | 0.41 |
| Spice powder | 0.18 | 0.18 | 0.18 | 0.18 | 0.18 | 0.18 | 0.18 | 0.18 | 0.18 |
| Xanthan gum | 0.05 | 0.05 | 0.05 | 0.05 | 0.05 | 0.05 | 0.05 | 0.05 | 0.05 |

TABLE 18

| | Comparative Example 5-7 | Comparative Example 5-9 | Experimental Example 5-15 | Experimental Example 5-16 | Experimental Example 5-17 |
|---|---|---|---|---|---|
| Overall preference | 2.5 ± 0.5 | 2.8 ± 0.5 | 3.1 ± 0.7* | 3.6 ± 0.5* | 4.1 ± 0.5* |
| Sweetness preference | 2.5 ± 0.3 | 3.7 ± 0.4 | 3.0 ± 0.2* | 3.7 ± 0.4* | 4.1 ± 0.4* |
| Intensity of sweetness | 2.9 ± 0.7 | 4.1 ± 0.6 | 3.1 ± 0.9 | 3.9 ± 0.3* | 4.2 ± 0.5* |
| Sweetness persistency | 2.8 ± 0.3 | 2.1 ± 0.3 | 3.1 ± 0.4 | 3.5 ± 0.4* | 3.7 ± 0.4* |

| | Comparative Example 5-8 | Comparative Example 5-9 | Experimental Example 5-18 | Experimental Example 5-19 | Experimental Example 5-20 |
|---|---|---|---|---|---|
| Overall preference | 2.2 ± 0.5 | 2.7 ± 0.6 | 2.5 ± 0.4 | 3.3 ± 0.4* | 3.7 ± 0.5* |
| Sweetness preference | 1.9 ± 0.5 | 3.5 ± 0.5 | 2.8 ± 0.4* | 3.3 ± 0.6* | 3.8 ± 0.6* |
| Intensity of sweetness | 1.9 ± 0.6 | 3.9 ± 0.4 | 2.6 ± 0.5* | 3.2 ± 0.5* | 3.7 ± 0.6* |
| Sweetness persistency | 2.3 ± 0.5 | 2.2 ± 0.4 | 2.7 ± 0.3 | 2.9 ± 0.4* | 3.1 ± 0.5* |

In Table 18, *indicates statistical significance.

As a result of the sensory evaluation, it was confirmed that the pork cutlet sauces prepared using the sweeteners obtained by applying allulose to oligosaccharide was increased in intensity of sweet taste, sweetness preference, taste persistency, and overall preference, as compared with the pork cutlet sauces prepared using either oligosaccharide or allulose. For meats (pork cutlets), harmony with a sauce is just as important as taste. It is considered that the sweeteners obtained by adding allulose to oligosaccharides had a high score on the overall preference because the sweeteners could maintain the initial sweetness of the food.

5-4. Fermented Milk

Using some of Experimental Examples obtained by the afore-described formulations and corresponding Comparative Examples, fermented milk samples were prepared according to the formulations as listed in Table 19, followed by performing sensory evaluation. Results are shown in Table 20.

Each of the prepared fermented milk samples was refrigerated for 1 day, numbered using a random number table, and then subjected to sensory evaluation for each item by 15 trained male and female panelists in the 20 to 50 age group.

In order to prevent interference between samples, a set of fermented milk samples was first prepared using fructooligosaccharide (Comparative Example 5-10), allulose (Comparative Example 5-12), and compositions prepared therefrom (Experimental Examples 5-21, 5-22, 5-23). Composition of each of the fermented milk samples is shown in Table 13. Then, another set of fermented milk samples was prepared using isomaltooligosaccharide (Comparative Example 5-11), allulose (Comparative Example 5-12), and compositions prepared therefrom (Experimental Examples 5-24, 5-25, 5-26), followed by sensory evaluation of each set. Here, the sensory evaluation was performed by a procedure in which each panelist expressed the intensity of sweetness and preference of the samples (fermented milk) after the ingestion on a 5 point scale.

TABLE 19

| Ingredient (wt %) | Comparative Example 5-10 | Comparative Example 5-11 | Comparative Example 5-12 | Experimental Example 5-21 | Experimental Example 5-22 | Experimental Example 5-23 | Experimental Example 5-24 | Experimental Example 5--25 | Experimental Example 5-26 |
|---|---|---|---|---|---|---|---|---|---|
| Purified water | 4.95 | 4.95 | 4.95 | 4.95 | 4.95 | 4.95 | 4.95 | 4.95 | 4.95 |
| High fructose | 3.00 | 3.00 | 3.00 | 3.00 | 3.00 | 3.00 | 3.00 | 3.00 | 3.00 |
| Fructooligosaccharide | 6.00 | | | 4.80 | 3.00 | 1.80 | | | |
| Isomaltooligosaccharide | | 6.00 | | | | | 4.80 | 3.00 | 1.80 |
| Allulose | | | 6.00 | 1.20 | 3.00 | 4.20 | 1.20 | 3.00 | 4.20 |
| Weight of allulose/Weight of oligosaccharide | — | — | — | 0.25 | 1 | 2.33 | 0.25 | 1 | 2.33 |
| Raw milk | 77.50 | 77.50 | 77.50 | 77.50 | 77.50 | 77.50 | 77.50 | 77.50 | 77.50 |
| Skimmed milk powder | 2.40 | 2.40 | 2.40 | 2.40 | 2.40 | 2.40 | 2.40 | 2.40 | 2.40 |
| Water soluble dietary fiber | 1.00 | 1.00 | 1.00 | 1.00 | 1.00 | 1.00 | 1.00 | 1.00 | 1.00 |
| Pectin | 0.08 | 0.08 | 0.08 | 0.08 | 0.08 | 0.08 | 0.08 | 0.08 | 0.08 |
| Concentrated fruit juice | 5.00 | 5.00 | 5.00 | 5.00 | 5.00 | 5.00 | 5.00 | 5.00 | 5.00 |
| *Lactobacillus* | 0.02 | 0.02 | 0.02 | 0.02 | 0.02 | 0.02 | 0.02 | 0.02 | 0.02 |
| Congener | 0.05 | 0.05 | 0.05 | 0.05 | 0.05 | 0.05 | 0.05 | 0.05 | 0.05 |

TABLE 20

| | Comparative Example 5-10 | Comparative Example 5-12 | Experimental Example 5-21 | Experimental Example 5-22 | Experimental Example 5-23 |
|---|---|---|---|---|---|
| Overall preference | 2.3 ± 0.5 | 2.0 ± 0.5 | 2.8 ± 0.6* | 3.7 ± 0.5* | 3.4 ± 0.5* |
| Sweetness preference | 2.3 ± 0.3 | 2.7 ± 0.6 | 2.8 ± 0.4* | 3.6 ± 0.6* | 3.2 ± 0.7* |
| Intensity of sweetness | 2.6 ± 0.5 | 3.6 ± 0.5 | 3.0 ± 0.7 | 3.5 ± 0.7* | 3.8 ± 0.5* |
| Sourness preference | 2.3 ± 0.6 | 2.2 ± 0.6 | 2.9 ± 0.5* | 3.6 ± 0.5* | 3.3 ± 0.6* |
| Aftertaste preference | 2.5 ± 0.4 | 2.2 ± 0.6 | 3.0 ± 0.5* | 3.8 ± 0.6* | 3.5 ± 0.5* |

| | Comparative Example 5-11 | Comparative Example 5-12 | Experimental Example 5-24 | Experimental Example 5-25 | Experimental Example 5-26 |
|---|---|---|---|---|---|
| Overall preference | 2.1 ± 0.4 | 2.2 ± 0.4 | 2.7 ± 0.7* | 3.1 ± 0.5* | 3.5 ± 0.6* |
| Sweetness preference | 1.7 ± 0.4 | 2.8 ± 0.6 | 2.5 ± 0.7* | 3.2 ± 0.5* | 3.5 ± 0.6* |
| Intensity of sweetness | 2.1 ± 0.4 | 3.5 ± 0.5 | 2.6 ± 0.5* | 3.0 ± 0.5* | 3.5 ± 0.6* |

TABLE 20-continued

| | | | | | |
|---|---|---|---|---|---|
| Sourness preference | 2.3 ± 0.6 | 2.3 ± 0.5 | 2.5 ± 0.4 | 3.1 ± 0.5* | 3.6 ± 0.4* |
| Aftertaste preference | 2.2 ± 0.3 | 2.2 ± 0.6 | 2.8 ± 0.4* | 3.3 ± 0.4* | 3.6 ± 0.4* |

In Table 20, *indicates statistical significance.

As a result of the sensory evaluation, it was confirmed that the fermented milk samples prepared using the sweeteners obtained by applying allulose to oligosaccharide were remarkably increased in intensity of sweet taste, sweetness preference and were also enhanced in sourness and aftertaste preference, thereby exhibiting considerably improved overall preference.

5-5. Other Foods

Sweeteners with allulose applied to oligosaccharides were prepared in the same manner as in Example 1 such that weight ratio of allulose to oligosaccharide was 4.24 (Experimental Example 5-27: fructooligosaccharide was used as oligosaccharide, Experimental Example 5-28: isomaltooligosaccharide was used as oligosaccharide), and were used for home cooking, followed by sensory evaluation. Results are shown in Table 21.

Specifically, fructooligosaccharide (Comparative Example 1), allulose (Comparative Example 3), and Experimental Example 5-27 were provided to 15 ordinary housewife panelists in their 30s to 40s, and were subjected to sensory evaluation after being used for general cooking at home. Here, the sweeteners were each placed in a transparent plastic container, numbered with a random number plate without a separate label, and provided together with a sensory questionnaire.

In addition, isomaltooligosaccharide (Comparative Example 2), allulose (Comparative Example 3), and Experimental Example 5-28 were also provided to the same 15 housewife panelists, and sensory evaluation was conducted through the same procedure as above.

Common home cooked foods were prepared using the same ingredients but with different sweeteners by each panelist. Then, after eating the foods together with other family members, each panelist evaluated taste and preference of the foods on a 5-point scale. Here, at least two dishes were cooked so as to confirm versatility. The cooked dishes are as follows:

Potato stew, braised quail eggs, rice with beef, braised mackerel, soy sauce braised potatoes, stir-fried fish cake, seasoned raw vegetables, grilled squid, stir-fried rice cake, bulgogi, stir-fried eggplant, stir-fried anchovies, stir-fried squid, steamed chili, yellowish overripe cucumber salad, stir-fried vegetables, grilled rice cake (dressing), carbonated water (syrup), braised black beans, kiwi tea, baked flour (syrup), roasted ribs, soy sauce braised saury, shredded daikon, ssamjang, stir-fried beef, shaved ice with sweetened red beans (syrup), stir-fried dried squid, salad (dressing), and seasoned vegetables.

TABLE 21

| | Comparative Example 1 | Comparative Example 3 | Experimental Example 5-27 | Comparative Example 2 | Comparative Example 3 | Experimental Example 5-28 |
|---|---|---|---|---|---|---|
| Overall preference | 3.1 ± 1.0 | 2.7 ± 1.1 | 4.0 ± 0.7* | 2.7 ± 0.9 | 2.5 ± 0.8 | 4.0 ± 0.5* |
| Sweetness preference | 3.1 ± 0.9 | 2.7 ± 1.1 | 3.7 ± 0.9* | 2.8 ± 0.9 | 2.5 ± 0.6 | 3.6 ± 0.6* |
| Aftertaste preference | 2.8 ± 0.8 | 2.0 ± 0.7 | 3.6 ± 0.7* | 2.3 ± 1.0 | 2.1 ± 0.8 | 3.4 ± 0.7* |

In Table 21, * indicates statistical significance.

As a result of sensory evaluation, it was confirmed that, regardless of the type of oligosaccharides, the sweetness preference, overall preference, and aftertaste preference of the foods using the sweeteners obtained by applying allulose to oligosaccharides (Experimental Example 5-27 and 5-28) were significantly higher ($p<0.05$).

Thus, it can be seen that the sweetener obtained by applying allulose to oligosaccharides according to the present application can significantly increase the sweetness intensity and preference of a food using the sweetener, as compared with typical oligosaccharide products used at home instead of sugar. Therefore, the sweetener according to the present application exhibits increased sweetness intensity while having low calorie content and thus can be applied to various foods and used as a substitute for sugar.

The invention claimed is:

1. A sweetener comprising allulose, fructooligosaccharide and a salt, wherein the allulose and the salt increase acid resistance and heat resistance of the fructooligosaccharide,
    wherein the ratio of allulose:fructooligosaccharide is 50:49-50:50,
    wherein the sweetener has 93.8 wt % to 95.7 wt % of fructooligosaccharide as measured after 24 hours of storage at pH 2, compared to a fructooligosaccharide weight at 0 hours of storage under the same conditions,
    wherein the salt comprises lactates, phosphates, or combinations thereof, and
    wherein the salt is present in an amount of 0.15 parts by weight to 0.3 parts by weight relative to 100 parts by weight of the sweetener.

2. The sweetener according to claim 1, wherein the sweetener has the acid resistance at pH 1 to 6.

* * * * *